United States Patent
Kim et al.

(10) Patent No.: US 11,930,349 B2
(45) Date of Patent: *Mar. 12, 2024

(54) COMPUTER SYSTEM FOR PRODUCING AUDIO CONTENT FOR REALIZING CUSTOMIZED BEING-THERE AND METHOD THEREOF

(71) Applicant: NAVER CORPORATION, Gyeonggi-do (KR)

(72) Inventors: Dae Hwang Kim, Seongnam-si (KR); Jung Sik Kim, Seongnam-si (KR); Dong Hwan Kim, Seongnam-si (KR); Ted Lee, Seoul (KR); Jeonghun Seo, Seoul (KR); Jiwon Oh, Seoul (KR)

(73) Assignee: NAVER CORPORATION, Gyeonggi-do (KR)

( * ) Notice: Subject to any disclaimer, the term of this patent is extended or adjusted under 35 U.S.C. 154(b) by 84 days.

This patent is subject to a terminal disclaimer.

(21) Appl. No.: 17/534,823

(22) Filed: Nov. 24, 2021

(65) Prior Publication Data

US 2022/0167104 A1 May 26, 2022

(30) Foreign Application Priority Data

Nov. 24, 2020 (KR) .................... 10-2020-0158485
Jun. 4, 2021 (KR) .................... 10-2021-0072524

(51) Int. Cl.
*H04S 7/00* (2006.01)
*G06F 3/04847* (2022.01)
(Continued)

(52) U.S. Cl.
CPC ............ *H04S 7/30* (2013.01); *G06F 3/04847* (2013.01); *G06F 3/165* (2013.01); *G06F 16/61* (2019.01);
(Continued)

(58) Field of Classification Search
CPC ........ H04S 7/30; H04S 3/008; H04S 2400/01; H04S 2400/11; G06F 16/687;
(Continued)

(56) References Cited

U.S. PATENT DOCUMENTS 9,654,895 B2  5/2017 Breebaart et al.
2014/0133683 A1  5/2014 Robinson et al.
(Continued)

FOREIGN PATENT DOCUMENTS

JP   A 04-15693 A   1/1992
JP   2005-150993 A   6/2005
(Continued)

OTHER PUBLICATIONS

Korean Office Action dated Jul. 19, 2022, issued in Korean Patent Application No. 10-2021-0072524.
(Continued)

*Primary Examiner* — David L Ton
(74) *Attorney, Agent, or Firm* — Harness, Dickey & Pierce, P.L.C.

(57) ABSTRACT

Provided are a computer system for producing audio content for realizing a user-customized being-there and a method thereof. The computer system may be configured to generate audio files based on respective audio signals that are respectively generated from a plurality of objects at a venue, set spatial features at the venue for the objects, respectively, using a production tool, and generate metadata for the audio files based on the spatial features. An electronic device may realize a being-there at the venue by rendering the audio files based on the spatial features in the metadata. That is, a user of the electronic device may feel a user-customized being-there as if the user directly listens to audio signals generated from corresponding objects at a venue in which the objects are provided.

18 Claims, 11 Drawing Sheets

(51) Int. Cl.
*G06F 3/16* (2006.01)
*G06F 16/61* (2019.01)
*G06F 16/687* (2019.01)
*H04S 3/00* (2006.01)

(52) U.S. Cl.
CPC ............ *G06F 16/687* (2019.01); *H04S 3/008* (2013.01); *G06F 2203/04803* (2013.01); *H04S 2400/01* (2013.01); *H04S 2400/11* (2013.01)

(58) Field of Classification Search
CPC ...... G06F 16/61; G06F 3/04847; G06F 3/165; G06F 2203/04803
See application file for complete search history.

(56) References Cited

U.S. PATENT DOCUMENTS

| | | |
|---|---|---|
| 2016/0142846 A1 | 5/2016 | Herre et al. |
| 2016/0192105 A1 | 6/2016 | Breebaart et al. |
| 2020/0053457 A1* | 2/2020 | Vilkamo .................. H04S 3/00 |
| 2020/0275230 A1 | 8/2020 | Laaksonen et al. |
| 2021/0029480 A1 | 1/2021 | Mate et al. |
| 2022/0116726 A1 | 4/2022 | Alur |
| 2022/0392457 A1 | 12/2022 | Kim et al. |

FOREIGN PATENT DOCUMENTS

| | | |
|---|---|---|
| JP | 2014-526168 A | 10/2014 |
| JP | 2019-535216 A | 12/2019 |
| JP | 2022-83443 A | 6/2022 |
| JP | 2022-83445 A | 6/2022 |
| KR | 10-2012-0062758 A | 6/2012 |
| KR | 10-1717928 B1 | 3/2017 |
| KR | 10-2019-0123300 A | 10/2019 |
| KR | 10-2019-0134854 A | 12/2019 |
| KR | 10-2020-0040745 A | 4/2020 |
| WO | WO-2015/182492 A1 | 12/2015 |
| WO | WO-2019/069710 A1 | 4/2019 |
| WO | WO-2020/010064 A1 | 1/2020 |

OTHER PUBLICATIONS

Japanese Office Action dated Dec. 6, 2022 issued in Japanese Patent Application No. 2021-190472.
Japanese Office Action dated Jun. 27, 2023 issued in corresponding Japanese Patent Application No. 2021-190472.
Korean Office Action dated Jun. 29, 2022 issued in corresponding Korean Patent Application No. 10-2021-0072522.
Japanese Office Action dated Dec. 6, 2022 issued in Japanese Patent Application No. 2021-190470.
Japanese Office Action dated Jun. 27, 2023 issued in Japanese Patent Application No. 2021-190470.
Gunnarsson, "Creating the Perfect Sound System with 3D Sound Reproduction", Jun. 27, 2017 (Year: 2017).
U.S. Office Action dated May 3, 2023 issued in co-pending U.S. Appl. No. 17/534,804.
U.S. Office Action dated Jun. 13, 2023 issued in co-pending U.S. Appl. No. 17/534,804.
U.S. Notice of Allowance dated Aug. 30, 2023 issued in co-pending U.S. Appl. No. 17/534,804.
Korean Office Action dated Jun. 29, 2022 issued in corresponding Korean Patent Application No. 10-2021-0072523.
Japanese Office Action dated Dec. 6, 2022 issued in Japanese Patent Application No. 2021-190471.
U.S. Office Action dated Jun. 27, 2023 issued in co-pending U.S. Appl. No. 17/534,919.
"s. Hiconmez, H. T. Sencar and I. Avcibas, Audio codec identification through payload sampling," 2011 IEEE International Workshop on Information Forensics and Security, Iguacu Falls, Brazil, 2011, pp. 1-6, doi: 10.1109/WIFS.2011.6123128. (Year: 2011).
U.S. Notice of Allowance dated Nov. 15, 2023 issued in co-pending U.S. Appl. No. 17/534,919.

* cited by examiner

COMPUTER SYSTEM FOR PRODUCING AUDIO CONTENT FOR REALIZING CUSTOMIZED BEING-THERE AND METHOD THEREOF

CROSS-REFERENCE TO RELATED APPLICATION(S)

This U.S. non-provisional application and claims the benefit of priority under 35 U.S.C. § 119 to Korean Patent Application Nos. 10-2020-0158485 filed on Nov. 24, 2020, and 10-2021-0072524 filed on Jun. 4, 2021, the entire contents of each of which are incorporated herein by reference in their entirety.

BACKGROUND

Technical Field

One or more example embodiments relate to computer systems for producing audio content for realizing a user-customized being-there using a production tool and/or methods thereof.

Related Art

In general, a content providing server provides audio content in a completed form for a user. Here, the audio content in the completed form, that is, the completed audio content is implemented by mixing a plurality of audio signals, and, for example, represents stereo audio content. Through this, an electronic device of a user receives the completed audio content and simply plays back the received audio content. That is, the user only listens to sound of a predetermined configuration based on the completed audio content.

SUMMARY

Some example embodiments provide computer systems for producing audio content for realizing a user-customized being-there and/or methods thereof.

According to an aspect of at least one example embodiment, a method by a computer system includes generating audio files based on respective audio signals, the audio files having been respectively generated from a plurality of objects at a venue, setting spatial features at the venue for the objects, respectively, using a production tool, and generating metadata for the audio files based on the spatial features.

According to an aspect of at least one example embodiment, there is provided a non-transitory computer-readable record medium storing a program, which when executed by at least one processor included in a computer system, causes the computer system to perform the aforementioned methods.

According to an aspect of at least one example embodiment, a computer system includes a memory and a processor configured to connect to the memory and to execute at least one instruction stored in the memory. The processor is configured to cause to the computer system to generate audio files based on respective audio signals, the audio signals having been respectively generated from a plurality of objects at a venue, set spatial features at the venue for the objects, respectively, using a production tool, and generate metadata for the audio files based on the spatial features.

According to example embodiments, it is possible to propose a production tool for producing audio content as materials for realizing a user-customized being-there. Here, a computer system may generate audio files for a plurality of objects at a specific venue, respectively. The computer system may generate metadata including spatial features at the venue for the objects or may generate and change audio files using the production tool. Here, the computer system may generate the spatial features for the objects, respectively, based on settings of a creator. Through this, an electronic device may reproduce user-customized audio content instead of simply playing back completed audio content. That is, the electronic device may implement stereophonic sound by rendering the audio files based on the spatial features in the metadata. Therefore, the electronic device may realize the user-customized being-there in association with audio and accordingly, a user of the electronic device may feel the user-customized being-there, as if the user directly listens to audio signals generated from specific objects at a specific venue.

Further areas of applicability will become apparent from the description provided herein. The description and specific examples in this summary are intended for purposes of illustration only and are not intended to limit the scope of the present disclosure.

DETAILED DESCRIPTION

Figure 1:
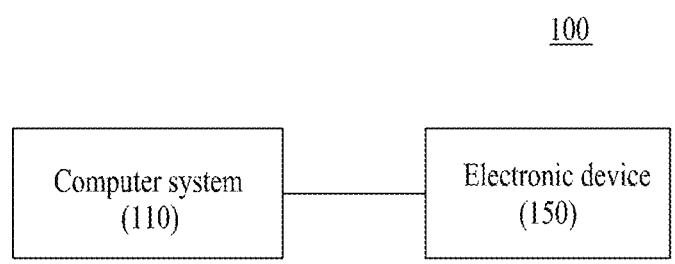
FIG. 1 is a diagram illustrating an example of a content providing system according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

In the following, the term "object" may represent a device or a person that generates an audio signal. For example, the object may include one of a musical instrument, an instrument player, a vocalist, a talker, a speaker that generates accompaniment or sound effect, and a background that generates ambience. The term "audio file" may represent audio data for an audio signal generated from each object.

In the following, the term "metadata" may represent information for describing a property of at least one audio file. Here, the metadata may include at least one spatial feature of the object. For example, the metadata may include at least one of position information about at least one object, group information representing a position combination of at least two objects, and environment information about a venue in which at least one object may be disposed. The venue may include, for example, a studio, a concert hall, a street, and a stadium.

Figure 2:
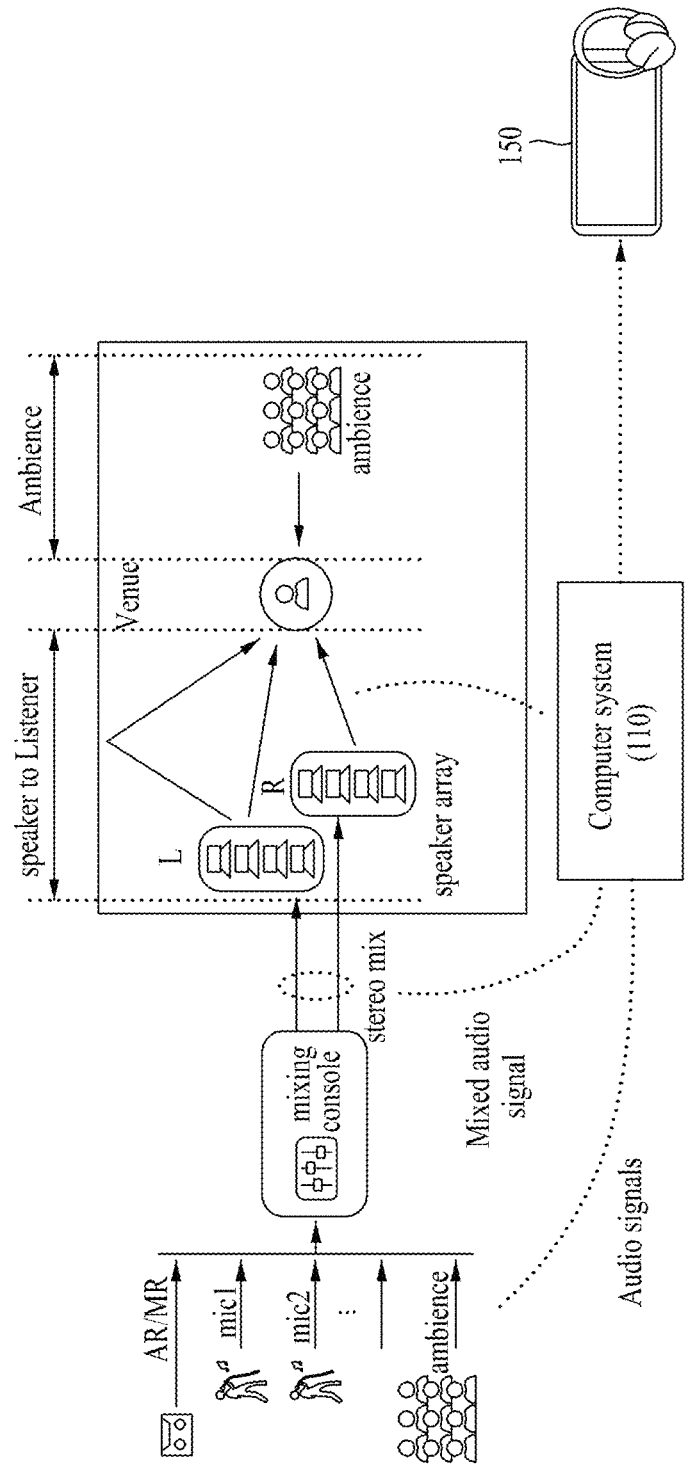
FIG. 2 illustrates an example of describing a function of a content providing system according to at least one example embodiment.
Figure 3:
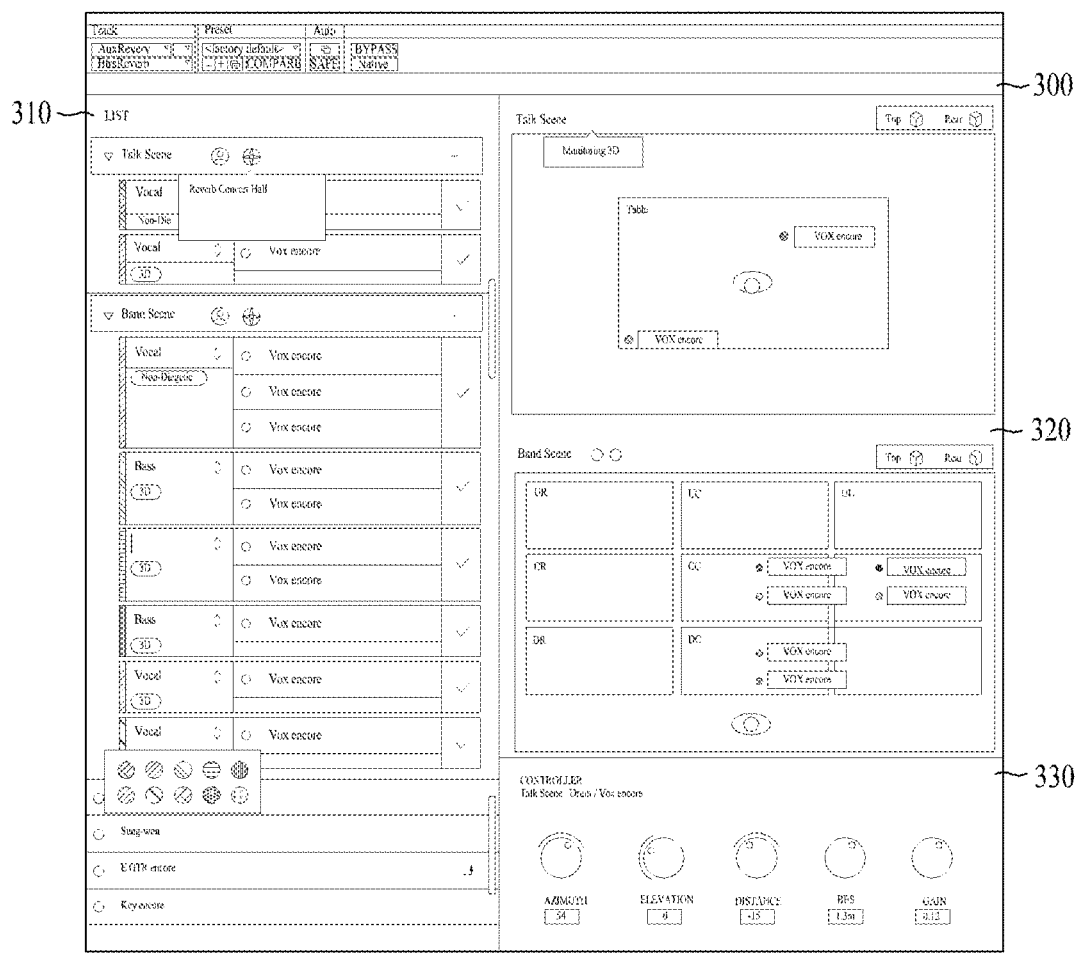
FIGS. 3 and 4 illustrate examples of a production tool of a computer system according to at least one example embodiment.
Figure 4:
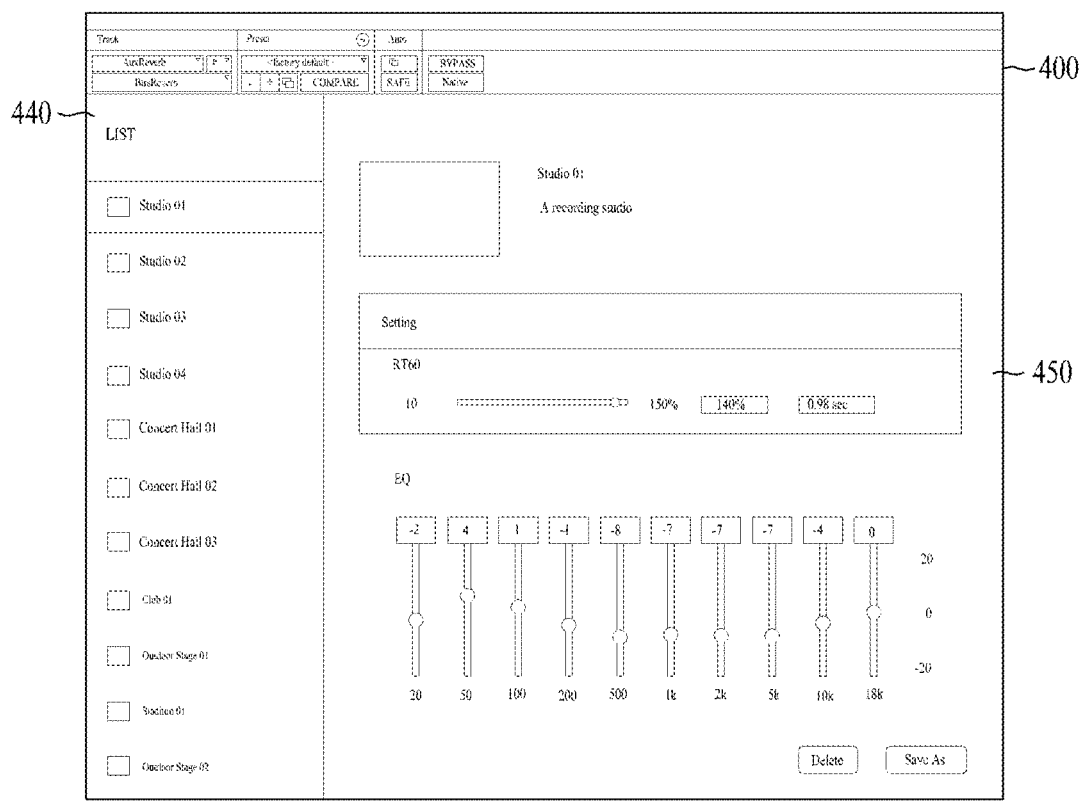

FIG. 1 is a diagram illustrating a content providing system 100 according to at least one example embodiment, and FIG. 2 illustrates an example of describing a function of the content providing system 100 according to at least one example embodiment. FIGS. 3 and 4 illustrate examples of a production tool of a computer system according to at least one example embodiment.

Referring to FIG. 1, the content providing system 100 may include a computer system 110 and an electronic device 150. For example, the computer system 110 may include at least one server. For example, the electronic device 150 may include at least one of a smartphone, a mobile phone, a navigation device, a computer, a laptop computer, a digital broadcasting termina, a personal digital assistant (PDA), a portable multimedia player (PMP), a tablet PC, a game console, a wearable device, an Internet of things (IoT) device, a home appliance, a medical device, and a robot.

The computer system 110 may provide content for a user. Here, the content may refer to various types of contents, for example, audio content, video content, virtual reality (VR) content, augmented reality (AR) content, and extended reality (XR) content. The content may include at least one of plain content and immersive content. The plain content may refer to completed content and the immersive content may refer to user-customized content. Hereinafter, description is made using the audio content as an example.

Plain audio content may be implemented in a stereo form by mixing audio signals generated from a plurality of objects. For example, referring to FIG. 2, the computer system 110 may obtain an audio signal in which audio signals of a venue are mixed and may generate the plain audio content based on the audio signal. Meanwhile, immersive audio content may include audio files for the audio signals generated from the plurality of objects at the venue and metadata related thereto. Here, in the immersive audio content, the audio files and the metadata related thereto may be individually present. For example, referring to FIG. 2, the computer system 110 may obtain audio files for a plurality of objects, respectively, and may generate the immersive audio content based on the audio files.

The electronic device 150 may play back content provided from the computer system 110. Here, the content may refer to various types of contents, for example, audio content, video content, VR content, AR content, and XR content. The content may include at least one of plain content and immersive content.

When the immersive audio content is received from the computer system 110, the electronic device 150 may obtain audio files and metadata related thereto from the immersive audio content. The electronic device 150 may render the audio files based on the metadata. Through this, the electronic device 150 may realize a user-customized being-there in association with audio based on the immersive audio content. Therefore, the user may feel being-there as if the user directly listens to an audio signal generated from a corresponding object at a venue in which at least one object is disposed.

To this end, the computer system 110 may set spatial features at a venue for objects, respectively, using a production tool. Here, the computer system 110 may set the spatial features of the objects based on an input of at least one creator using a graphic interface, for example, a first graphic interface 300 and a second graphic interface 400. The spatial feature may relate to at least one of at least an object, a position of a corresponding object, a venue in which the corresponding object is disposed, and a target at the corresponding venue (e.g., a position of a listener). In some example embodiments, the computer system 110 may output the graphic interface (e.g., the first graphic interface 300 of FIG. 3 or the second graphic interface 400 of FIG. 4), using the production tool, and may set the spatial features of objects based on an input of at least one creator through the first graphic interface 300 or the second graphic interface 400. Here, the computer system 110 may set a spatial feature for each object, and may set spatial features for at least two objects as a single group.

In some example embodiments, the computer system 110 may set the spatial features of the objects through both the first graphic interface 300 of FIG. 3 and the second graphic interface 400 of FIG. 4. According to an example embodiment, the computer system 110 may simultaneously output the first graphic interface 300 and the second graphic interface 400. Here, the first graphic interface 300 and the second graphic interface 400 may be dividedly provided or may also be integrated into a single interface and thereby provided. According to another example embodiment, the computer system 110 may individually output the first graphic interface 300 and the second graphic interface 400.

The first graphic interface 300 may display a list of at least one venue, and may include at least one of a first area 310 for displaying a list of at least one object at each venue, a second area 320 for setting a position of an object selected from the first area 310, and a third area 330 for fine-tuning the position or an audio effect for the object selected from the first area 310. For example, at least one of the first area 310, the second area 320, and the third area 330 may be displayed on the same screen. That is, the computer system 110 may provide the first graphic interface 300 and may detect an input of at least one creator through the first graphic interface 300. The creator may generate or select a specific venue or may select a specific object at the specific venue through the first area 310. The creator may select a position of the specific object at the specific venue through the second area 320. Through this, the computer system 110 may set a spatial feature of a corresponding object based on a position of the corresponding object. Meanwhile, the creator may fine-tune the audio effect for the corresponding object through the third area 330. Here, the audio effect may represent a positional relationship between an object and a listener in a corresponding space. For example, the audio effect may include azimuth, elevation, distance, BES, gain, etc., of a position of an object relative to a position of a listener. Herein, although the position of the object is represented through azimuth, elevation, and distance, a scheme capable of representing the position of the object is not limited to a specific coordinate system. Through this, the computer system 110 may set a spatial feature of a corresponding object based on a position and an audio effect of the corresponding object.

The second graphic interface 400 may include at least one of a fourth area 440 for displaying a list of at least one venue and a fifth area 450 for fine-tuning an audio effect related to a venue selected from the fourth area 440. That is, the computer system 110 may provide the second graphic interface 400 and may detect an input of at least one creator through the second graphic interface 400. The creator may select a specific venue through the fourth area 440. The creator may fine-tune the audio effect related to the corresponding venue through the fifth area 450. Through this, the computer system 110 may set the spatial features of the objects at the corresponding venue based on the audio effect related to the corresponding venue.

According to example embodiments, although not illustrated, the computer system 110 may include at least one of an electronic device (also referred to as a production studio) and a server. For example, the electronic device may refer to a device equipped with various hardware, for example, an audio console and an audio interface such as Dante, and may include at least one of a smartphone, a mobile phone, a navigation device, a computer, a laptop computer, a digital broadcasting terminal, a PDA, a PMP, a tablet PC, a game console, a wearable device, an IoT device, a home appliance, a medical device, and a robot.

The electronic device may generate audio files for a plurality of objects and metadata related thereto. To this end, the electronic device may obtain audio signals generated from objects at a specific venue, respectively. Here, the electronic device may obtain each audio signal through a microphone directly attached to each object or installed adjacent to each object. Further, the electronic device may also recognize a direct position of each object through a camera. The electronic device may generate the audio files using the audio signals, respectively. Further, the electronic device may generate the metadata related to the audio files. Thus, the electronic device may set spatial features at a venue for objects, respectively. For example, the electronic device may set the spatial features at the venue for the objects, respectively, based on an input of the creator through the graphic interface (e.g., the first graphic interface 300 and/or the second graphic interface 400). Here, the electronic device may detect at least one of position information about each object and group information representing a position combination of at least two objects using a direct position of each object or a position of a microphone for each object. Also, the electronic device may detect environment information about a venue in which objects are disposed.

The electronic device may generate metadata based on spatial features of objects. Here, the electronic device may generate presets (or alternatively desired sets) selectable by the electronic device 150 by combining the spatial features of the objects. For example, the electronic device may generate presets by combining environment information about a specific venue, position information of specific objects, and audio effects.

The server may transmit the audio files and the metadata related thereto to the electronic device 150. For example, the server may generate immersive audio content in a desired (or alternatively, predetermined) format based on the audio files and the metadata related thereto. Here, in the immersive audio content, the audio files and the metadata related thereto may be individually present. The server may transmit the immersive audio content to the electronic device 150. Here, the server may be a live streaming server.

Through this, the electronic device 150 of the user may render the audio files based on the metadata. For example, the electronic device 150 may select a single preset from among presets based on an input of the user through a user interface (UI). That is, the electronic device 150 may display a plurality of presets and may select a single preset from among the presets based on the input of the user. Therefore, the electronic device 150 may render the audio files using the spatial features of the objects based on the selected preset. In this manner, the electronic device 150 may realize a user-customized being-there for the corresponding venue.

In some example embodiments, the computer system 110 may compose audio files and metadata as a pulse code modulation (PCM) audio signal and transmit the same. Here, the computer system 110 may embed, in a metadata track of the PCM signal, metadata generated based on an input of at least one creator or metadata received from another electronic device through the graphic interface (e.g., the first graphic interface 300 and/or the second graphic interface 400). Here, the metadata may be embedded through time-synchronization with an audio channel based on a frame size of an audio codec to be used for encoding at a final transmission. Metadata time-synchronized for each frame may be embedded as a plurality of sets for each frame. Here, the embedded metadata of the plurality of sets may include the same content. Because a metadata set with the same content is included, it may help mitigate or prevent loss and damage of the metadata in a subsequent audio encoding process. For example, the computer system 110 may apply a drift correction based on a characteristic of hardware of an electronic device. When the drift correction is applied, a difference with the metadata generated based on the input of the at least one creator or the metadata received from the other electronic device through the graphic interface (e.g., the first graphic interface 300 and/or the second graphic interface 400) may occur. Therefore, when generating metadata, the metadata may be generated to mitigate or prevent application of an inter-channel correction by the drift correction and may be written in the metadata track.

Figure 5:
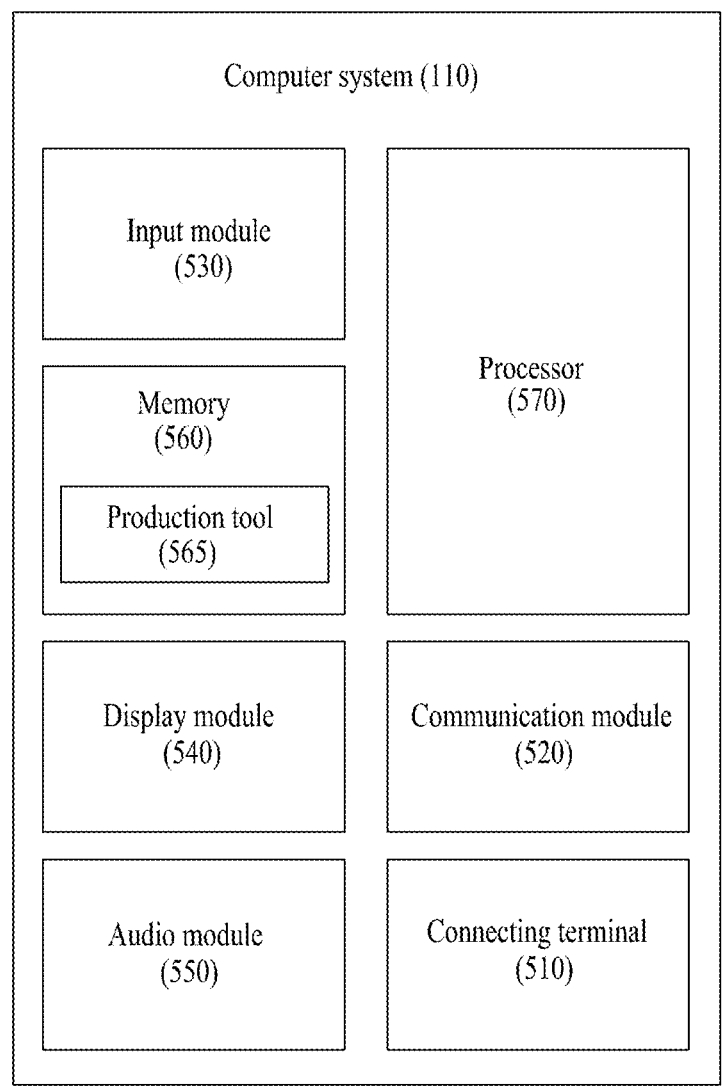
FIG. 5 is a diagram illustrating an example of an internal configuration of a computer system according to at least one example embodiment.

FIG. 5 is a diagram illustrating an example of an internal configuration of the computer system 110 according to at least one example embodiment.

Referring to FIG. 5, the computer system 110 may include at least one of a connecting terminal 510, a communication module 520, an input module 530, a display module 540, an audio module 550, a memory 560, and a processor 570. In some example embodiments, at least one of components of the computer system 110 may be omitted and at least one another component may be added. In some example embodiments, at least two components among components of the computer system 110 may be implemented as single integrated circuitry.

The connecting terminal 510 may be physically connected to an external device in the computer system 110. For example, the electronic device may include another electronic device. Thus, the connecting terminal 510 may include at least one connector. For example, the connector may include at least one of a high-definition multimedia interface (HDMI) connector, a universal serial bus (USB) connector, a secure digital (SD) card connector, and an audio connector.

The communication module 520 may communicate with the external device in the computer system 110. The communication module 520 may establish a communication channel between the computer system 110 and the external device and communicate with the external device through the communication channel. For example, the external device may include at least one of an external server and the electronic device 150. The communication module 520 may include at least one of a wired communication module and a wireless communication module. The wired communication module may be connected to the external device in a wired manner through the connecting terminal 510 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, wireless fidelity (WiFi) direct, and infrared data association (IrDA). The far field communication module may communicate with the external device using a far field communication scheme. Here, the far field communication module may communicate with the external device over a network. For example, the network may include at least one of a cellular network, the Internet, and a computer network such as a local area network (LAN) and a wide area network (WAN).

The input module 530 may input a signal to be used for at least one component of the computer system 110. The input module 530 may include at least one of an input device configured for the user to directly input a signal to the computer system 110, a sensor device configured to detect an ambient environment and to generate a signal, and a camera module configured to capture an image and to generate image data. For example, the input device may include at least one of a microphone, a mouse, and a keyboard. In some example embodiments, the sensor device may include at least one of a touch circuitry configured to detect a touch and a sensor circuitry configured to measure strength of force occurring due to the touch.

The display module 540 may visually display information. For example, the display module 540 may include at least one of a display, a hologram device, and a projector. For example, the display module 540 may be configured as a touchscreen through assembly to at least one of the sensor circuitry and the touch circuitry of the input module 530.

The audio module 550 may auditorily play back information. For example, the audio module 550 may include at least one of a speaker, a receiver, an earphone, and a headphone.

The memory 560 may store a variety of data used by at least one component of the computer system 110. For example, the memory 560 may include at least one of a volatile memory and a non-volatile memory. Data may include at least one program and input data or output data related thereto. The program may be stored in the memory 560 as software including at least one instruction. Here, the memory 560 may store a production tool 565 to generate audio files and metadata related thereto.

The processor 570 may control at least one component of the computer system 110 by executing the program of the memory 560. Through this, the processor 570 may perform data processing or operation. Here, the processor 570 may execute an instruction stored in the memory 560. The processor 570 may provide content for a user. Here, the processor 570 may transmit the content through the communication module 520. The content may include at least one of video content, plain audio content, and immersive audio content.

The processor 570 may generate audio files, respectively, based on audio signals that are respectively generated from a plurality of objects at a specific venue. The processor 570 may generate metadata including spatial features at the venue that are set for the objects, respectively, using the production tool 565. According to an example embodiment, the processor 570 may generate audio signals playable in real time based on the audio files and the metadata. According to another example embodiment, the processor 570 may transmit the audio files and the metadata of the objects. Thus, the processor 570 may store the audio files and the metadata of the objects.

Here, the processor 570 may set spatial features of objects based on an input of at least one creator using the graphic interface (e.g., the first graphic interface 300 and/or the second graphic interface 400), and may store the spatial features in association with the objects, respectively. The spatial feature may refer to at least one of at least one object, a position of a corresponding object, a venue in which the corresponding object is disposed, and a target at the corresponding venue (e.g., a position of a listener). Through this, the spatial features stored in association with the objects may be used to render the audio files generated by the objects and may also be used to render other audio files associated with the objects. For example, the spatial features may be used for rendering of a reverb track to express a being-there. In some example embodiments, the processor 570 may output the graphic interface (e.g., the first graphic interface 300 of FIG. 3 and/or the second graphic interface 400 of FIG. 4), using the production tool 565 and may set spatial features of objects based on an input of at least one creator through the first graphic interface 300 or the second graphic interface 400. Here, the computer system 110 may set a spatial feature for each object, and may set spatial features for at least two objects as a single group.

Figure 6:
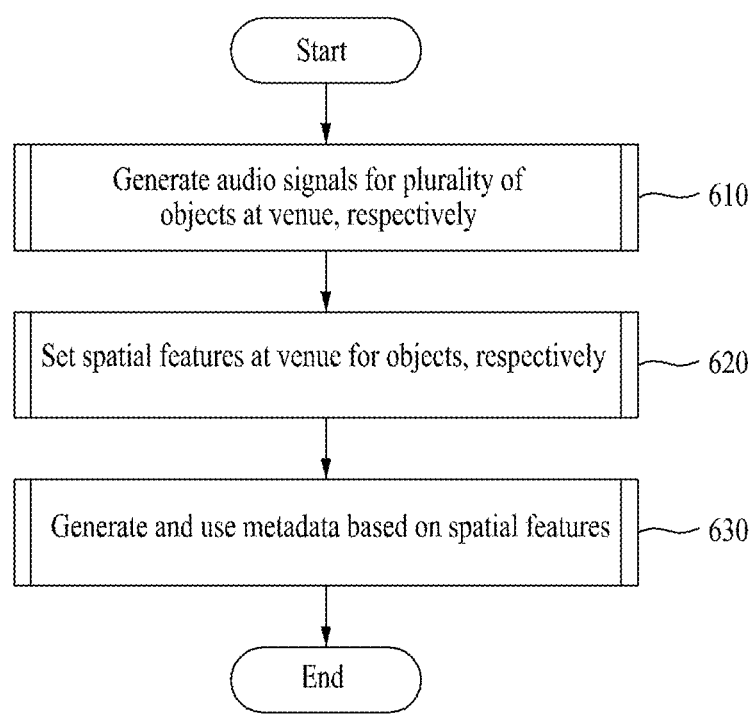
FIG. 6 is a flowchart illustrating an example of an operation procedure of a computer system according to at least one example embodiment.

FIG. 6 is a flowchart illustrating an example of an operation procedure of the computer system 110 according to at least one example embodiment.

Referring to FIG. 6, in operation 610, the computer system 110 may generate audio files for a plurality of objects at a venue, respectively. The processor 570 may obtain the audio files generated from the objects at the venue, respectively. Further description related thereto is made with reference to FIG. 7.

Figure 7:
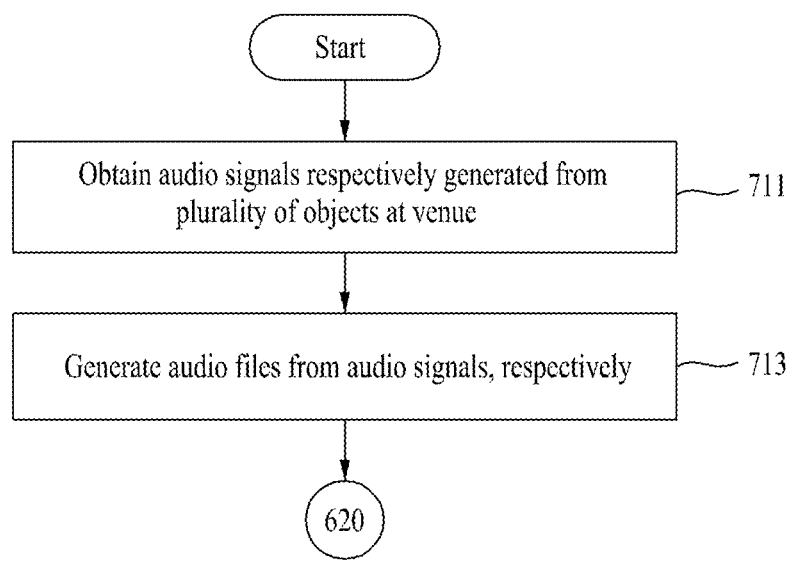
FIG. 7 is a flowchart illustrating an example of a detailed procedure of generating audio files of FIG. 6.

FIG. 7 is a flowchart illustrating an example of a detailed procedure of generating audio files (operation 610) of FIG. 6.

Referring to FIG. 7, in operation 711, the computer system 110 may obtain audio signals of a plurality of objects at a specific venue. That is, the processor 570 may obtain the audio signals generated from the objects at the venue, respectively. Here, the processor 570 may obtain each audio signal through a microphone directly attached to each object or installed to be adjacent to each object.

In operation 713, the computer system 110 may generate audio files from the audio signals, respectively. The processor 570 included in the computer system 110 may generate the audio files from the audio signals of the objects, respectively.

The computer system 110 may return to FIG. 6 and may proceed with operation 620.

Referring again to FIG. 6, in operation 620, the computer system 110 may set spatial features at the venue for the objects, respectively, using the production tool 565. Here, the processor 570 may set the spatial features of the objects based on an input of at least one creator through the graphic interface (e.g., the first graphic interface 300 and/or the second graphic interface 400). The spatial feature may refer to at least one of at least one object, a position of a corresponding object, a venue in which the corresponding object is disposed, a target at the corresponding venue, for example, a position of a listener. Here, the processor 570 may set a spatial feature for each object and may set spatial features for at least two objects as a single group. Further description related thereto is made with reference to FIG. 8.

Figure 8:
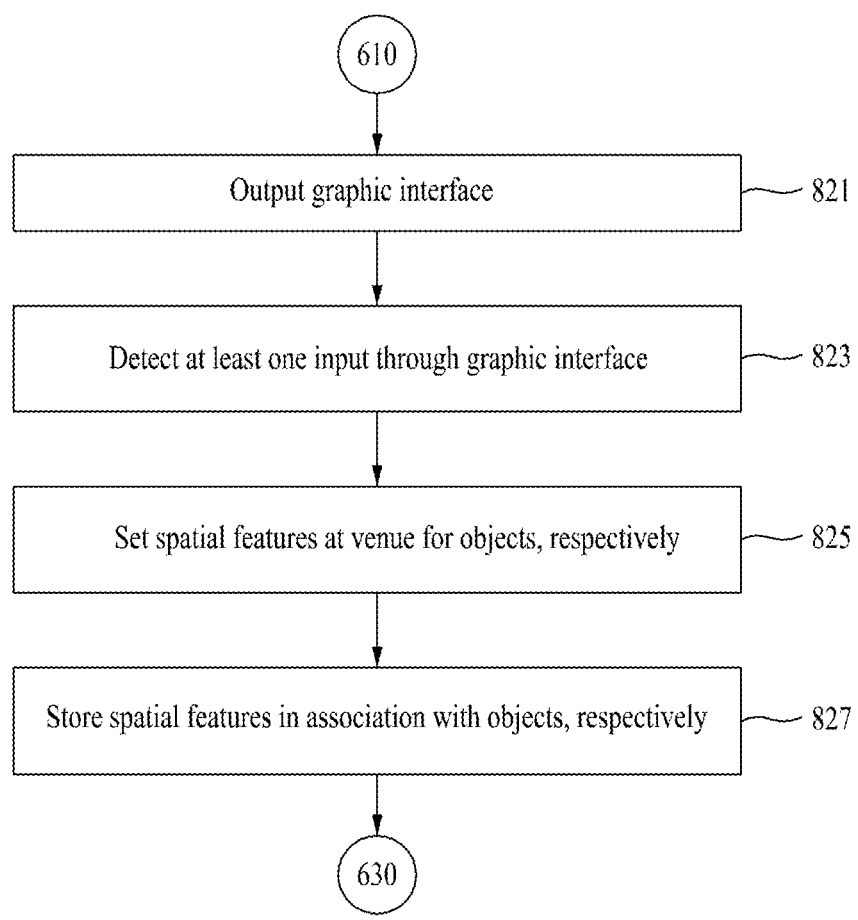
FIG. 8 is a flowchart illustrating an example of a detailed procedure of setting spatial features of FIG. 6.

FIG. 8 is a flowchart illustrating a detailed procedure of setting spatial features (operation 620) of FIG. 6.

Referring to FIG. 8, in operation 821, the computer system 110 may output the graphic interface (e.g., the first graphic interface 300 and/or the second graphic interface 400) for the creator. As illustrated in at least one of FIGS. 3 and 4, the processor 570 may output the first graphic interface 300 or the second graphic interface 400 using the production tool 565. For example, the processor 570 may output the first graphic interface 300 or the second graphic interface 400 to an external device through the communication module 520. As another example, the processor 570 may output the first graphic interface 300 or the second graphic interface 400 through the display module 540.

In some example embodiments, the graphic interface may include at least one of the first graphic interface 300 and the second graphic interface 400. According to an example embodiment, the computer system 110 may simultaneously output both the first graphic interface 300 and the second graphic interface 400. Here, the first graphic interface 300 and the second graphic interface 400 may be dividedly provided and may also be integrated into a single interface and thereby provided. According to another example embodiment, the computer system 100 may individually provide the first graphic interface 300 and the second graphic interface 400.

The first graphic interface 300 may display a list of at least one venue, and may include at least one of the first area 310 for displaying a list of at least one object at each venue, the second area 320 for setting a position of an object selected from the first area 310, and the third area 330 for fine-tuning an audio effect for the object selected from the first area 310. Here, the audio effect may represent a positional relationship between an object and a listener in a corresponding space. For example, the audio effect may include azimuth, elevation, distance, BES, gain, etc., of a position of an object relative to a position of a listener. For example, at least one of the first area 310, the second area 320, and the third area 330 may be displayed on the same screen. The second user interface 400 may include at least one of the fourth area 440 for displaying a list of at least one venue and the fifth area 450 for fine-tuning an audio effect related to a venue selected from the fourth area 440.

In operation 823, the computer system 110 may detect an input of at least one creator through the graphic interface (e.g., the first graphic interface 300 and/or the second graphic interface 400). The processor 570 may detect the input of the at least one creator through the graphic interface (e.g., the first graphic interface 300 and/or the second graphic interface 400) using the production tool 565. For example, the processor 570 may receive the input of the creator from the external device through the communication module 520. As another example, the processor 570 may detect the input of the creator through the input module 530.

In some example embodiments, the processor 570 may detect an input of at least one creator through the first graphic interface 300 or the second graphic interface 400. The processor 570 may detect the input of the at least one creator through the first graphic interface 300. The creator may generate or select a specific venue through the first area 310, and may select a specific object at the corresponding venue. The creator may select a position of the corresponding object at the corresponding venue through the second area 320. Meanwhile, the creator may fine-tune an audio effect for the corresponding object through the third area 330. The processor 570 may detect the input of the at least one creator through the second graphic interface 400. The creator may select a specific venue through the fourth area 440. The creator may fine-tune an audio effect related to the corresponding venue through the fifth area 450.

In operation 825, the computer system 110 may set the spatial features at the venue for the objects, respectively. The processor 570 may set the spatial features of the objects based on the input of the at least one creator through the graphic interface (e.g., the first graphic interface 300 and/or the second graphic interface 400). Here, the processor 570 may set a spatial feature for each object and may set spatial features for at least two objects as a single group.

In some example embodiments, the processor 570 may set spatial features of objects based on at least one of the first graphic interface 300 and the second graphic interface 400. The processor 570 may set a spatial feature of a corresponding object based on a position selected from the second area 320 for the object at a specific venue selected from the first area 310 of the first graphic interface 300. Through this, the computer system 110 may set the spatial feature of the corresponding object based on a position and an audio effect of the corresponding object. Further, for the object at the specific venue selected from the first area 310 of the first graphic interface 300, the processor 570 may set the spatial feature of the corresponding object based on the audio effect fine-tuned in the third area 330. The processor 570 may set the spatial features of the objects at the corresponding venue based on the audio effect fine-tuned in the fifth area 450 for the venue selected from the fourth area 440 of the second graphic interface 400.

In operation 827, the computer system 110 may store the spatial features in association with the objects, respectively. The processor 570 may store, in the memory 560, the spatial features in association with the objects, respectively. Through this, the spatial features stored in association with the objects may be used to render the audio files generated by the objects in operation 610 and may be used to render other audio files associated with the objects. For example, the spatial features may be used for rendering of a reverb track to express a being-there.

The computer system 110 may return to FIG. 6 and may proceed with operation 630.

Referring again to FIG. 6, in operation 630, the computer system 110 may generate metadata based on the spatial features of the objects. The processor 570 may generate the metadata to include the spatial features of the objects. The computer system 100 may use the metadata. According to an example embodiment, the processor 570 may generate audio signals playable in real time based on the audio files and the metadata. That is, the processor 570 may render the audio files based on the metadata and, through this, the audio signals playable in real time may be generated. For example, the audio signals may be generated in one of a stereo form, a surround form, and a binaural form. Accordingly, in a live service environment, the processor 570 may perform real-time change and monitoring for the audio files generated by the objects. According to another example embodiment, the processor 570 may transmit audio files of objects and metadata. To this end, the processor 570 may store the audio files of the objects and the metadata. Further description related thereto is made with reference to FIG. 9.

Figure 9:
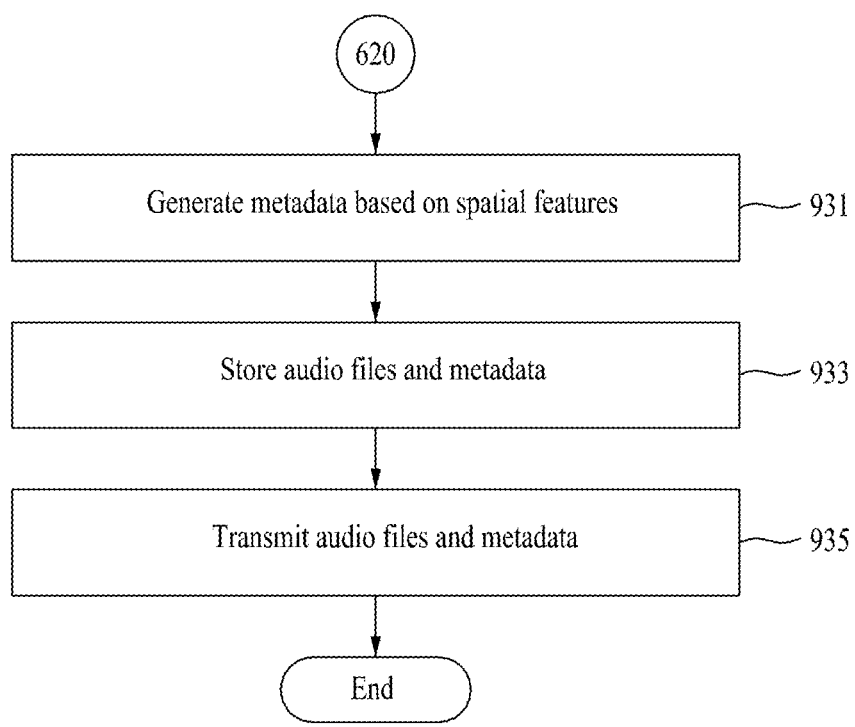
FIG. 9 is a flowchart illustrating an example of a detailed procedure of generating metadata of FIG. 6.

FIG. 9 is a flowchart illustrating an example of a detailed procedure of generating the metadata (operation 630) of FIG. 6.

Referring to FIG. 9, in operation 931, the computer system 110 may generate the metadata based on the spatial features. The processor 570 may generate the metadata to include the spatial features of the objects. In operation 933, the computer system 110 may store the audio files for the objects and the metadata related thereto. The processor 570 may store the audio files of the objects and the metadata together in the memory 560. In operation 935, the computer system 110 may transmit the audio files for the objects and the metadata related thereto. The processor 570 may transmit the audio files of the objects and the metadata to the external server or the electronic device 150 through the communication module 520. Here, the processor 570 may compress and encode the audio files and the metadata and may transmit the same. According to an example embodiment, in response to detecting an instruction from the creator through the input module 530, the processor 570 may transmit audio files of objects and metadata to the external server or the electronic device 150. In response to receiving a request from the external server or the electronic device 150 through the communication module 520, the processor 570 may transmit the audio files of the objects and the metadata together to the external server or the electronic device 150.

Figure 10:
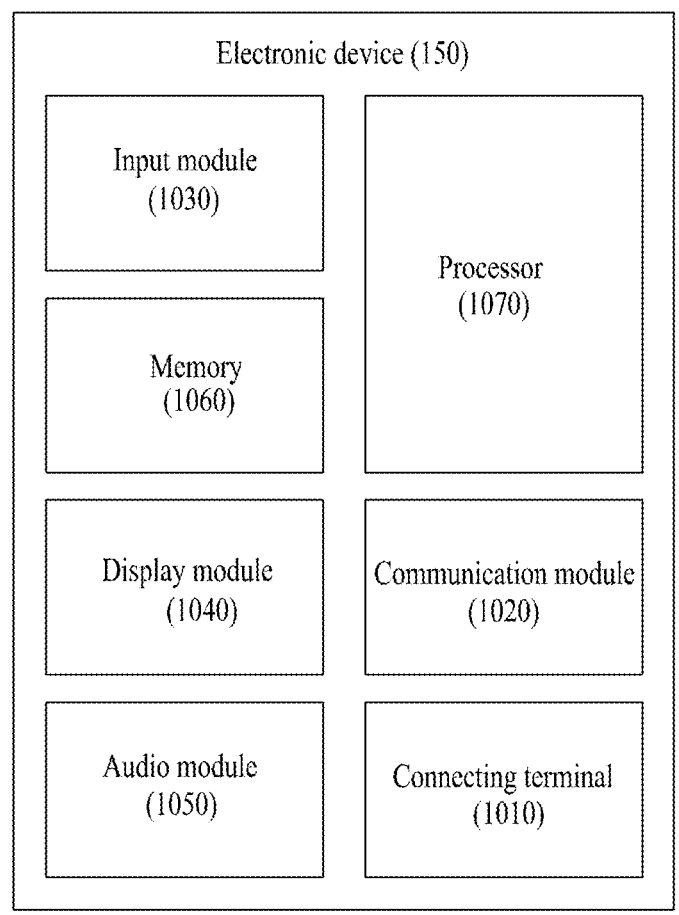
FIG. 10 is a diagram illustrating an example of an internal configuration of an electronic device according to at least one example embodiment.

FIG. 10 is a diagram illustrating an example of an internal configuration of the electronic device 150 according to at least one example embodiment.

Referring to FIG. 10, the electronic device 150 may include at least one of a connecting terminal 1010, a communication module 1020, an input module 1030, a display module 1040, an audio module 1050, a memory 1060, and a processor 1070. In some example embodiments, at least one of components of the electronic device 150 may be omitted and at least one another component may be added. In some example embodiments, at least two components among components of the electronic device 150 may be implemented as a single integrated circuitry.

The connecting terminal 1010 may be physically connected to an external device in the electronic device 150. For example, the external device may include another electronic device. To this end, the connecting terminal 1010 may include at least one connector. For example, the connector may include at least one of an HDMI connector, a USB connector, an SD card connector, and an audio connector.

The communication module 1020 may communicate with the external device in the electronic device 150. The communication module 1020 may establish a communication channel between the electronic device 150 and the external device and may communicate with the external device through the communication channel. For example, the external device may include the computer system 110. The communication module 1020 may include at least one of a wired communication module and a wireless communication module. The wired communication module may be connected to the external device in a wired manner through connecting terminal 1010 and may communicate with the external device in the wired manner. The wireless communication module may include at least one of a near field communication module and a far field communication module. The near field communication module may communicate with the external device using a near field communication scheme. For example, the near field communication scheme may include at least one of Bluetooth, WiFi direct, and IrDA. The far field communication module may communicate with the external device using a far field communication scheme. Here, the far field communication module may communicate with the external device through a network. For example, the network may include at least one of a cellular network, the Internet, and a computer network such as a LAN and a WAN.

The input module 1030 may input a signal to be used for at least one component of the electronic device 150. The input module 1030 may include at least one of an input device configured for the user to directly input a signal to the electronic device 150, a sensor device configured to detect an ambient environment and to generate a signal, and a camera module configured to capture an image and to generate image data. For example, the input device may include at least one of a microphone, a mouse, and a keyboard. In some example embodiments, the sensor device may include at least one of a head tracking sensor, a head-mounted display (HMD) controller, a touch circuitry configured to detect a touch, and a sensor circuitry configured to measure strength of force occurring due to the touch.

The display module 1040 may visually display information. For example, the display module 1040 may include at least one of a display, an HMD, a hologram device, and a projector. For example, the display module 1040 may be configured as a touchscreen through assembly to at least one of the sensor circuitry and the touch circuitry of the input module 1030.

The audio module 1050 may auditorily play back information. For example, the audio module 1050 may include at least one of a speaker, a receiver, an earphone, and a headphone.

The memory 1060 may store a variety of data used by at least one component of the electronic device 150. For example, the memory 1060 may include at least one of a volatile memory and a non-volatile memory. Data may include at least one program and input data or output data related thereto. The program may be stored in the memory 1060 as software including at least one instruction and, for example, may include at least one of an operating system (OS), middleware, and an application. For example, the application may include an application for operating in interaction with the production tool 565 of the computer system 110.

The processor 1070 may control at least one component of the electronic device 150 by executing the program of the memory 1060. Through this, the processor 1070 may perform data processing or operation. Here, the processor 1070 may execute an instruction stored in the memory 1060. The processor 1070 may play back content provided from the computer system 110. The processor 1070 may play back video content through the display module 1040 or may play back at least one of plain audio content and immersive audio content through the audio module 1050.

The processor 1070 may receive audio files and metadata for objects at a specific venue from the computer system 110 through the communication module 1020. The processor 1070 may render the audio files based on the metadata. Through this, the processor 1070 may render the audio files based on spatial features of the objects in the metadata.

Figure 11:
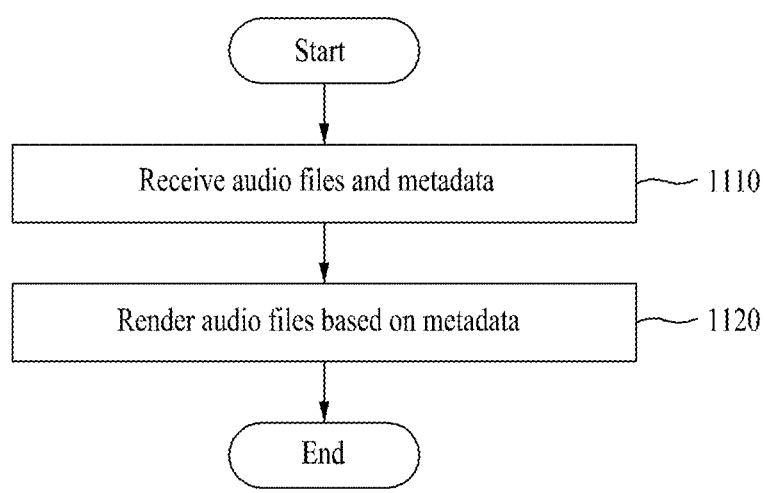
FIG. 11 is a flowchart illustrating an example of an operation procedure of an electronic device according to at least one example embodiment.

FIG. 11 is a flowchart illustrating an example of an operation procedure of the electronic device 150 according to at least one example embodiment.

Referring to FIG. 11, in operation 1110, the electronic device 150 may receive audio files and metadata. The processor 1070 may receive audio files and metadata for objects at a specific venue from a server through the communication module 1020. Here, the processor 1070 may receive the audio files and the metadata using a second communication protocol, for example, an HLS.

In operation 1120, the electronic device 150 may select at least one object from among the objects based on the metadata. Here, the processor 1070 may select at least one object from among the objects based on an input of a user through a user interface. For example, the processor 1070 may output the user interface for the user. For example, the processor 1070 may output the user interface to an external device through the communication module 1020. As another example, the processor 1070 may output the user interface through the display module 1040. The processor 1070 may select at least one object from among the objects based on an input of at least one user through the user interface.

In operation 1120, the electronic device 150 may render the audio files based on the metadata. The processor 1070 may render the audio files based on spatial features of the selected objects in the metadata. The processor 1070 may play back final audio signals through the audio module 1050 by applying the spatial features of the objects to the audio files of the objects. Through this, the electronic device 150 may realize a user-customized being-there for a corresponding venue. Accordingly, the user may feel the user-customized being-there as if the user directly listens to audio signals generated from corresponding objects at a venue in which the objects are disposed.

According to some example embodiments, it is possible to propose the production tool 565 for producing audio content as materials for realizing a user-customized being-there, for a user. Here, the computer system 110 may generate audio files for a plurality of objects at a specific venue, respectively. The computer system 110 may generate metadata including spatial features at the venue for the objects using the production tool 565. Here, the computer system 110 may generate the spatial features for the objects, respectively, based on settings of a creator. Through this, the electronic device 150 may reproduce user-customized audio content instead of simply playing back completed audio content. That is, the electronic device 150 may implement stereophonic sound by rendering the audio files based on the spatial features in the metadata. Therefore, the electronic device 150 may realize the user-customized being-there in association with audio by using the audio files and the metadata as materials and accordingly, a user of the electronic device 150 may feel the user-customized being-there, as if the user directly listens to audio signals generated from specific objects at a specific venue.

A method by the computer system 110 according to some example embodiments may include generating audio files based on audio signals (which are generated from a plurality of objects at a venue, respectively), respectively (operation 610), setting spatial features at the venue for the objects, respectively, using the production tool 565 (operation 620), and generating metadata for the audio files based on the spatial features (operation 630).

According to example embodiments, the setting of the spatial features (operation 620) may include outputting a graphic interface (e.g., the first graphic interface 300 and/or the second graphic interface 400) (operation 821), setting the spatial features for the objects, respectively, based on at least one input through the graphic interface (e.g., the first graphic interface 300 and/or the second graphic interface 400) (operation 823) (operation 825), and storing the spatial features in association with the objects, respectively (operation 827).

According to some example embodiments, the metadata may include at least one of position information about each of the objects, group information representing a position combination of at least two objects among the objects and environment information about the venue.

According to some example embodiments, each of the objects may include one of a musical instrument, an instrument player, a vocalist, a talker, a speaker, and a background.

According to some example embodiments, the graphic interface 300 may include the first area 310 for displaying objects at a venue and the second area 320 displayed on the same screen as that of the first area 310 and for setting a position of an object selected from the first area 310.

According to some example embodiments, the setting of the spatial features (operation 825) may include setting each of the spatial features based on the position.

According to some example embodiments, the graphic interface 300 may further include the third area 330 displayed on the same screen as that of the first area 310 and for fine-tuning an audio effect for the object selected from the first area 310.

According to some example embodiments, the setting of the spatial features (operation 825) may include setting each of the spatial features based on the position and the audio effect.

According to example embodiments, the graphic interface 400 may include at least one of the fourth area 440 for displaying at least one venue and the fifth area 450 displayed on the same screen as that of the fourth area 440 and for fine-tuning an audio effect related to a venue selected from the fourth area 440.

According to some example embodiments, the setting of the spatial features (operation 825) may include setting each of the spatial features based on the audio effect.

According to some example embodiments, the fourth area 440 may be displayed on the same area as that of the first area 310 or displayed on an area different from that of the first area 310.

According to some example embodiments, the method by the computer system 110 may further include at least one of rendering the audio files based on the metadata, storing the audio files and the metadata together (operation 933), and transmitting the audio files and the metadata together (operation 935).

According to some example embodiments, the transmitting of the audio files and the metadata together (operation 935) may include composing the audio files and the metadata as a PCM audio signal and transmitting the same.

According to some example embodiments, the metadata may be embedded in a metadata track of the PCM audio signal, synchronized with the audio files based on a frame size of an audio codec to be used for encoding the audio files and the metadata, and generated to mitigate or prevent application of an inter-channel correction by a drift correction, and written in the metadata track, and included as a plurality of sets in a single frame.

The computer system 110 according to some example embodiments may include the memory 560 and the processor 570 configured to connect to the memory 560 and to execute at least one instruction stored in the memory 560.

According to example embodiments, the processor 570 may be configured to generate audio files based on audio signals (which are generated from a plurality of objects at a venue, respectively), respectively, to set spatial features at the venue for the objects, respectively, using the production tool 565, and to generate metadata for the audio files based on the spatial features.

According to some example embodiments, the processor 570 may output the graphic interface 300 or 400, to set the spatial features for the objects, respectively, based on at least one input through the graphic interface 300 or 400, and to store the spatial features in association with the objects, respectively.

According to some example embodiments, the metadata for at least one audio file may include at least one of position information about each of the objects, group information representing a position combination of at least two objects among the objects and environment information about the venue.

According to some example embodiments, each of the objects may include one of a musical instrument, an instrument player, a vocalist, a talker, a speaker, and a background.

According to some example embodiments, the graphic interface 300 may include the first area 310 for displaying objects at a venue and the second area 320 displayed on the same screen as that of the first area 310 and for setting a position of an object selected from the first area 310.

According to some example embodiments, the processor 570 may be configured to set each of the spatial features based on the position.

According to some example embodiments, the graphic interface 300 may further include the third area 330 displayed on the same screen as that of the first area 310 and for fine-tuning an audio effect for the object selected from the first area 310.

According to some example embodiments, the processor 570 may be configured to set each of the spatial features based on the position and the audio effect.

According to some example embodiments, the graphic interface 400 may further include at least one of the fourth area 440 for displaying at least one venue and the fifth area 450 displayed on the same screen as that of the fourth area 440 and for fine-tuning an audio effect related to a venue selected from the fourth area 440.

According to some example embodiments, the processor 570 may be configured to set each of the spatial features based on the audio effect.

According to some example embodiments, the fourth area 440 may be displayed on the same area as that of the first area 310 or displayed on an area different from that of the first area 310.

According to some example embodiments, the processor 570 may be configured to render the audio files based on the metadata, to store the audio files and the metadata together, or to transmit the audio files and the metadata together.

According to some example embodiments, the processor 570 may be configured to compose the audio files and the metadata as a PCM audio signal and to transmit the same.

According to some example embodiments, the metadata may be embedded in a metadata track of the PCM audio signal, synchronized with the audio files based on a frame size of an audio codec to be used for encoding the audio files and the metadata, and generated to prevent application of an inter-channel correction by a drift correction and included in the metadata track, and included as a plurality of sets in a single frame.

The apparatuses described herein may be implemented using hardware components and/or a combination of hardware components and software components. For example, a processing device and components described herein may be implemented using one or more general-purpose or special purpose computers, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or at least one combination thereof, for independently or collectively instructing or configuring the processing device to operate as desired. Software and/or data may be embodied permanently or temporarily in any type of machine, component, physical equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable media including program instructions to implement various operations embodied by a computer. Here, the media may continuously store programs executable by a computer or may temporally store the same for execution or download. The media may be various record devices or storage devices in a form in which one or a plurality of hardware components is coupled and may be distributed in a network. Examples of the media include magnetic media such as hard disks, floppy disks, and magnetic tape, optical media such as CD ROM disks and DVD, magneto-optical media such as floptical disks, and hardware devices that are specially configured to store program instructions, such as read-only memory (ROM), random access memory (RAM), flash memory, and the like. Examples of other media may include recording media and storage media managed by an app store that distributes applications or a venue, a server, and the like that supplies and distributes other various types of software.

The example embodiments and the terms used herein are not construed to limit the technique described herein to specific example embodiments and may be understood to include various modifications, equivalents, and/or substitutions. Like reference numerals refer to like elements throughout. As used herein, the singular forms "a," "an," and "the," are intended to include the plural forms as well, unless the context clearly indicates otherwise. Herein, the expressions, "A or B," "at least one of A and/or B," "A, B, or C," "at least one of A, B, and/or C," and the like may include any possible combinations of listed items. Terms "first," "second," etc., are used to describe various components and the components should not be limited by the terms. The terms are simply used to distinguish one component from another component. When a component (e.g., a first component) is described to be "(functionally or communicatively) connected to" or "accessed to" another component (e.g., a second component), the component may be directly connected to the other component or may be connected through still another component (e.g., a third component).

The term "module" used herein may include a unit configured as hardware or a combination of hardware and software (e.g., firmware), and may be interchangeably used with, for example, the terms "logic," "logic block," "part," "circuit," etc. The module may be an integrally configured part, a minimum unit that performs at least one function, or a portion thereof. For example, the module may be configured as an application-specific integrated circuit (ASIC).

According to some example embodiments, each component (e.g., module or program) of the aforementioned components may include a singular entity or a plurality of entities. According to the example embodiments, at least one component among the aforementioned components or operations may be omitted, or at least one another component or operation may be added. Alternatively or additionally, the plurality of components (e.g., module or program) may be integrated into a single component. In this case, the integrated component may perform the same or similar functionality as being performed by a corresponding component among a plurality of components before integrating at least one function of each component of the plurality of components. According to the example embodiments, operations performed by a module, a program, or another component may be performed in parallel, repeatedly, or heuristically, or at least one of the operations may be performed in different order or omitted. Alternatively, at least one another operation may be added.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A method by a computer system, the method comprising:
    generating audio files based on respective audio signals, the audio signals having been respectively generated from a plurality of objects at a venue;
    setting spatial features at the venue for the objects, respectively, using a production tool; and
    generating metadata for the audio files based on the spatial features,
    wherein the setting comprises,
        outputting a graphic interface,
        setting the spatial features for the objects, respectively, based on at least one input through the graphic interface, and
        storing the spatial features in association with the objects, respectively.

2. The method of claim 1, wherein the metadata includes at least one of position information about each of the objects, group information representing a position combination of at least two objects among the objects, and environment information about the venue.

3. The method of claim 1, wherein each of the objects includes one of a musical instrument, an instrument player, a vocalist, a talker, a speaker, and a background.

4. The method of claim 1, wherein
    the graphic interface includes,
        a first area for displaying the objects at the venue, and a second area displayed on a same screen as that of the first area and for setting a position of an object selected from the first area, and the setting the spatial features comprises setting each of the spatial features based on the position.

5. The method of claim 4, wherein the graphic interface further includes a third area displayed on the same screen as that of the first area and for fine-tuning an audio effect for the object selected from the first area, and the setting comprises setting each of the spatial features based on the position and the audio effect.

6. The method of claim 4, wherein the graphic interface further includes at least one of
a third area for displaying at least one venue, and
a fourth area displayed on a same screen as that of the third area and for fine-tuning an audio effect related to a select venue selected from the third area, and the setting comprises setting each of the spatial features based on the audio effect.

7. The method of claim 6, wherein the third area is displayed on a same area as that of the first area or displayed on an area different from that of the first area.

8. The method of claim 1, further comprising at least one of:
rendering the audio files based on the metadata; and
storing the audio files and the metadata together.

9. A method by a computer system, the method comprising:
generating audio files based on respective audio signals, the audio signals having been respectively generated from a plurality of objects at a venue;
setting spatial features at the venue for the objects, respectively, using a production tool;
generating metadata for the audio files based on the spatial features; and
transmitting the audio files and the metadata together,
wherein the transmitting comprises composing the audio files and the metadata as a pulse code modulation (PCM) audio signal and transmitting the same, and
the metadata is embedded in a metadata track of the PCM audio signal, synchronized with the audio files based on a frame size of an audio codec to be used for encoding the audio files and the metadata, and is included as a plurality of sets in a single frame.

10. A non-transitory computer-readable record medium storing a program, which when executed by at least one processor included in a computer system, causes the computer system to perform the method of claim 1.

11. A computer system comprising:
a memory; and
a processor configured to connect to the memory and to execute at least one instruction stored in the memory to cause the computer system to,
generate audio files based on audio signals, respectively, the audio signals having been generated from a plurality of objects at a venue, respectively,
set spatial features at the venue for the objects, respectively, using a production tool, and generate metadata for the audio files based on the spatial features, wherein the processor is further configured to cause the computer system to, output a graphic interface to set the spatial features for the objects, respectively, based on at least one input through the graphic interface, and store the spatial features in association with the objects, respectively.

12. The computer system of claim 11, wherein the metadata includes at least one of position information about each of the objects, group information representing a position combination of at least two objects among the objects, and environment information about the venue.

13. The computer system of claim 11, wherein each of the objects includes one of a musical instrument, an instrument player, a vocalist, a talker, a speaker, and a background.

14. The computer system of claim 11, wherein
the graphic interface includes,
a first area for displaying the objects at the venue, and
a second area displayed on a same screen as that of the first area and for setting a position of an object selected from the first area, and the processor is further configured to cause the computer system to set each of the spatial features based on the position.

15. The computer system of claim 14, wherein
the graphic interface further includes a third area displayed on the same screen as that of the first area and for fine-tuning an audio effect for the object selected from the first area, and the processor is configured to cause the computer system to set each of the spatial features based on the position and the audio effect.

16. The computer system of claim 14, wherein
the graphic interface further includes at least one of,
a third area for displaying at least one venue, and
a fourth area displayed on a same screen as that of the third area and for fine-tuning an audio effect related to a select venue selected from the fourth area, and the processor is further configured to cause the computer system to set each of the spatial features based on the audio effect.

17. The computer system of claim 11, wherein the processor is further configured to cause the computer system to render the audio files based on the metadata, store the audio files and the metadata together, or transmit the audio files and the metadata together.

18. The computer system of claim 17, wherein the processor is further configured to
cause the computer system to compose the audio files and the metadata as a pulse code modulation (PCM) audio signal and to transmit the same, and
the metadata is embedded in a metadata track of the PCM audio signal, synchronized with the audio files based on a frame size of an audio codec to be used for encoding the audio files and the metadata, and is included as a plurality of sets in a single frame.

* * * * *